(12) United States Patent
Doxey et al.

(10) Patent No.: US 9,868,367 B2
(45) Date of Patent: Jan. 16, 2018

(54) STRUCTURAL CAM FOR LATCH

(71) Applicant: Johnson Controls Technology Company, Holland, MI (US)

(72) Inventors: Kyle M. Doxey, Ann Arbor, MI (US); Bruce A. Hiemstra, Ann Arbor, MI (US)

(73) Assignee: Johnson Controls Technology Company, Holland, MI (US)

( * ) Notice: Subject to any disclaimer, the term of this patent is extended or adjusted under 35 U.S.C. 154(b) by 170 days.

(21) Appl. No.: 14/906,889

(22) PCT Filed: Jul. 22, 2014

(86) PCT No.: PCT/US2014/047686
§ 371 (c)(1),
(2) Date: Jan. 21, 2016

(87) PCT Pub. No.: WO2015/013326
PCT Pub. Date: Jan. 29, 2015

(65) Prior Publication Data
US 2016/0152161 A1 Jun. 2, 2016

Related U.S. Application Data

(60) Provisional application No. 61/857,579, filed on Jul. 23, 2013.

(51) Int. Cl.
*B60N 2/20* (2006.01)
*B60N 2/08* (2006.01)
(Continued)

(52) U.S. Cl.
CPC ............. *B60N 2/08* (2013.01); *B60N 2/06* (2013.01); *B60N 2/20* (2013.01); *B60N 2/3047* (2013.01);
(Continued)

(58) Field of Classification Search
CPC ....... B60N 2/2356; B60N 2/2352; B60N 2/20
(Continued)

(56) References Cited

U.S. PATENT DOCUMENTS 2,608,429 A * 8/1952 Wise .................. E05B 85/24
292/222
4,684,174 A * 8/1987 Bell .................... B60N 2/2352
297/366

(Continued)

FOREIGN PATENT DOCUMENTS

CN     101006238 A    7/2007
CN     101445068 A    6/2009
(Continued)

OTHER PUBLICATIONS

International Preliminary Report on Patentability and Written Opinion of the International Searching Authority in PCT/US2014/047686 dated Feb. 4, 2016, 6 pages.
(Continued)

*Primary Examiner* — Syed A Islam
(74) *Attorney, Agent, or Firm* — Foley & Lardner LLP (57) ABSTRACT

A latch for a vehicle seat may include a hooking component with a hook engagement surface, a first cam with a first cam engagement surface, and a second cam with a second cam engagement surface. The hooking component may be rotatable about a first axis and the first cam and the second cam may be rotatable about a second axis between an engaged position and an unengaged position. The hook engagement surface may contact at least one of the first cam engagement surface and the second cam engagement surface in the engaged position. One of the hook engagement surface or the first cam engagement surface may include a stepped surface extending incrementally from either the hook engagement surface or the first cam engagement surface.

15 Claims, 10 Drawing Sheets

(51) Int. Cl.
*B60N 2/06* (2006.01)
*B60N 2/30* (2006.01)
*B60N 2/235* (2006.01)
*B60N 2/02* (2006.01)

(52) U.S. Cl.
CPC .......... *B60N 2/2352* (2013.01); *B60N 2/2356* (2013.01); *B60N 2002/0216* (2013.01)

(58) Field of Classification Search
USPC .... 297/358, 378.11, 378.12, 378.13, 378.14, 297/367 R, 368, 366, 367 P, 370, 371
See application file for complete search history.

(56) References Cited

U.S. PATENT DOCUMENTS

| | | | | |
|---|---|---|---|---|
| 4,747,641 | A * | 5/1988 | Bell | B60N 2/2213 297/366 |
| 4,765,680 | A * | 8/1988 | Kawashima | B60N 2/2352 297/365 |
| 4,822,100 | A * | 4/1989 | Bell | B60N 2/2352 297/366 |
| 5,028,084 | A * | 7/1991 | Fukumoto | E05L 381/06 292/201 |
| 5,375,915 | A * | 12/1994 | Harry | B60N 2/0292 297/354.12 |
| 7,364,237 | B2 * | 4/2008 | Grable | B60N 2/20 297/367 R |
| 8,783,775 | B2 * | 7/2014 | Kienke | B60N 2/20 297/366 |
| 2002/0008419 | A1 * | 1/2002 | Boltze | B60N 2/2352 297/367 R |
| 2003/0160490 | A1 * | 8/2003 | Nock | B60N 2/2352 297/367 R |
| 2004/0036339 | A1 * | 2/2004 | Christoffel | B60N 2/20 297/367 R |
| 2004/0135378 | A1 * | 7/2004 | Buedding | E05L 381/20 292/216 |
| 2005/0082865 | A1 | 4/2005 | Doxey et al. | |
| 2006/0226687 | A1 * | 10/2006 | Leconte | B60N 2/235 297/367 R |
| 2008/0060397 | A1 | 3/2008 | Sato | |
| 2008/0122281 | A1 * | 5/2008 | Weber | B60N 2/20 297/366 |
| 2009/0108657 | A1 * | 4/2009 | Becker | B60N 2/2352 297/367 R |
| 2009/0284063 | A1 * | 11/2009 | Quast | B60N 2/2352 297/366 |
| 2010/0141007 | A1 * | 6/2010 | Kienke | B60N 2/206 297/367 R |
| 2010/0259061 | A1 | 10/2010 | Paing | |
| 2013/0113261 | A1 * | 5/2013 | Mikasa | B60N 2/236 297/367 P |
| 2013/0187426 | A1 * | 7/2013 | Nagura | B60N 2/2356 297/367 P |
| 2013/0285430 | A1 * | 10/2013 | Ohba | B60N 2/2352 297/367 P |
| 2013/0300134 | A1 * | 11/2013 | Jayasuriya | E05L 377/08 292/129 |

FOREIGN PATENT DOCUMENTS

| | | |
|---|---|---|
| CN | 102084073 A | 6/2011 |
| DE | 10025605 C1 | 9/2001 |
| DE | 10 2004 021516 A1 | 11/2005 |
| EP | 2 067 917 A2 | 6/2009 |
| JP | 2009-083603 A | 4/2009 |
| JP | 5094957 | 12/2012 |
| WO | WO-2009/069851 A1 | 6/2009 |
| WO | WO-2012/117958 A1 | 9/2012 |

OTHER PUBLICATIONS

International Search Report and Written Opinion of the International Searching Authority dated Dec. 18, 2014, in PCT/US2014/047686, 8 pages.
Office Action dated Jan. 31, 2017, received in corresponding Japanese application No. 2016-529839, 6 pages.
Office Action dated Apr. 14, 2017, in corresponding Korean Application No. 10-2016-7004370 (7 pages) and English translation (8 pages).
Office Action dated Dec. 29, 2016, received in corresponding Chinese application No. 2014800509753, 7 pages.
Examination Report dated Sep. 23, 2016, received in corresponding European Application No. 14 748 088.3, 4 pages.

* cited by examiner

STRUCTURAL CAM FOR LATCH

CROSS REFERENCE TO RELATED APPLICATIONS

The present application is a U.S. National Stage of International Application No. PCT/US2014/047686 filed on Jul. 22, 2014, which claims the benefit of U.S. Provisional Patent Application No. 61/857,579 filed on Jul. 23, 2013, the entire disclosures of all of which are incorporated herein by reference.

FIELD

The disclosure relates generally to vehicle seats and, more specifically, relates to a vehicle seat and a latch or seat locking mechanism.

BACKGROUND

Figure 12A:
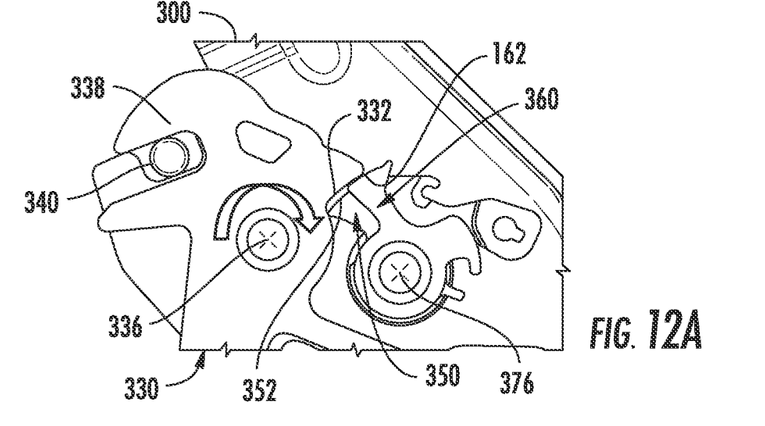
FIGS. 12A-12C are front views of a previous striker latch.
Figure 12B:
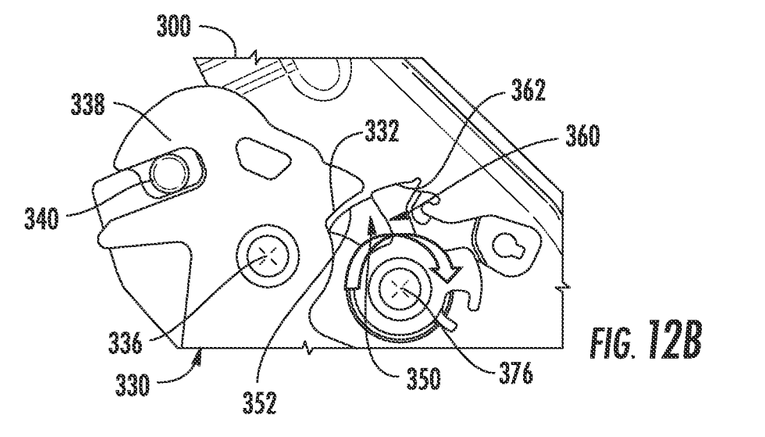
Figure 12C:
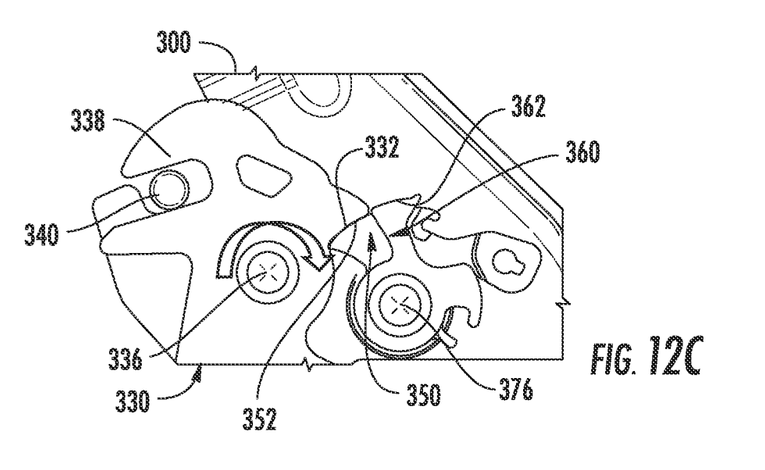

A conventional striker latch, as shown in FIGS. 12A-12C, includes a hooking mechanism 330 attached to a bracket 300. The hooking mechanism 330 hooks around a striker 340 with a hook 338 in order to lock the striker 340 into a particular position. The striker 340 is attached to a portion of a vehicle seat. The hooking mechanism 330 is rotatable about a first axis 336 and is locked in place by a structural cam 350 and a comfort cam 360. The structural cam 350 and the comfort cam 360 are rotatable about a second axis 376 and include a structural cam engagement surface 352 and a comfort cam engagement surface 362, respectively, which are engagable with a smooth hook engagement surface 332 on the hooking mechanism 330.

The comfort cam engagement surface 362 contacts the hook engagement surface 332 in the engaged position and the structural cam engagement surface 352 is spaced apart from the hook engagement surface 332. However, high stresses or forces (such as the end or top of the seat cushion while the seat is in a stadium position) are transferred to the striker 340. The striker 340 applies the force to the hooking mechanism 330, which forces the hooking mechanism 330 to rotate toward the cams 350 and 360 (as shown in FIG. 12A). Accordingly, the force may exceed the ability of the comfort cam to maintain its lock and cause the comfort cam 360 to back drive away and disengage or release from the hooking mechanism 330 (as shown in FIG. 12B). Once the comfort cam 360 back drives, the hooking mechanism 330 is free to rotate until it contacts the structural cam 350. Since there is a gap between the structural cam 350 and the hooking mechanism 330, the hook engagement surface 332 impacts and slams down on structural cam engagement surface 352 (as shown in FIG. 12C), creating a noise (akin to a "gun trigger" or popping noise). This noise is loud and unpleasant for the occupant. The gap may be, for example, 3-4 mm. Due to specific variations in the dimensions, sizes, positions, and tolerances of the parts, the structural cam cannot have a closer fit with the hooking mechanism 330 and gap cannot be reduced.

SUMMARY

According to one embodiment, a latch for a vehicle seat may include a hooking component with a hook engagement surface, a first cam with a first cam engagement surface, and a second cam with a second cam engagement surface. The hooking component may be rotatable about a first axis and the first cam and the second cam may be rotatable about a second axis between an engaged position and an unengaged position. The hook engagement surface may contact at least one of the first cam engagement surface and the second cam engagement surface in the engaged position. One of the hook engagement surface or the first cam engagement surface may include a stepped surface extending incrementally from either the hook engagement surface or the first cam engagement surface.

According to another embodiment, a vehicle seat may include a seat back, a seat cushion, a striker attached to either the seat back or the seat cushion, and a latch. At least one of the seat back or the seat cushion may be movable relative to the other of the seat back or the seat cushion. The striker may be engagable with and removable from the latch between a locked position and an unlocked position. The striker may be engaged with the latch in the locked position and either the seat back or the seat cushion may not be able to move relative to the other in the locked position. The latch may include a hooking component with a hook engagement surface, a first cam with a first cam engagement surface, and a second cam with a second cam engagement surface. The hooking component may be rotatable about a first axis and the first cam and the second cam may be rotatable about a second axis between an engaged position and an unengaged position. The hook engagement surface may contact at least one of the first cam engagement surface and the second cam engagement surface in the engaged position. One of the hook engagement surface or the first cam engagement surface may include a stepped surface extending incrementally from either the hook engagement surface or the first cam engagement surface.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Features, aspects, and advantages of the present invention will become apparent from the following description, appended claims, and the accompanying exemplary embodiments shown in the drawings, which are briefly described below.

DETAILED DESCRIPTION

Referring generally to the figures, disclosed herein is a latch mechanism for locking one component to another component, as shown according to exemplary embodiments. The latch mechanism may further allow at least one of the components to move relative to the other component. In one embodiment, the latch mechanism may allow one portion of a vehicle seat to move relative to another portion of a vehicle seat and to lock into position. The latch mechanism may further secure the components of the vehicle seat relative to each other. More specifically, due to a stepped surface between the cams within the latch mechanism, the latch mechanism may have a reduced gap or clearance between the hooking mechanism and the cams, which may further reduce or eliminate any noise and prevent excessive movement within the seat. Accordingly, the latch mechanism may have greater tolerances and will not result in a loud "popping" noise when one of the cams disengages.

Figure 1:
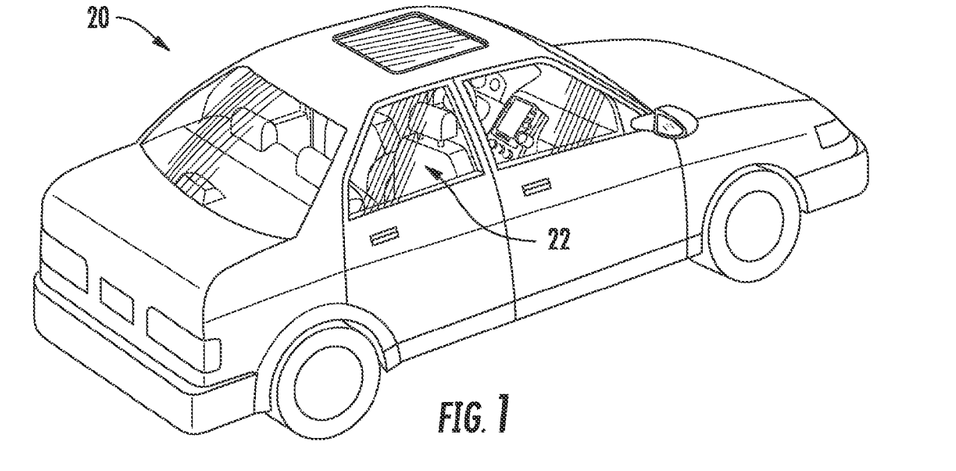
FIG. 1 is a perspective view of a vehicle according to one embodiment.

FIG. 1 illustrates an exemplary embodiment of a vehicle 20 in which the latch mechanism may be placed. The vehicle 20 may include an interior passenger compartment containing a vehicle seat 22 for providing seating to an occupant. Although a four door sedan automobile is shown in FIG. 1, the folding mechanism may be used in a variety of applications, but are particularly useful within a seat in any type of vehicle, such as a two door or four door automobile, a car, a truck, a SUV, a van, a train, a boat, an airplane, or other suitable vehicular conveyance.

Figure 2:
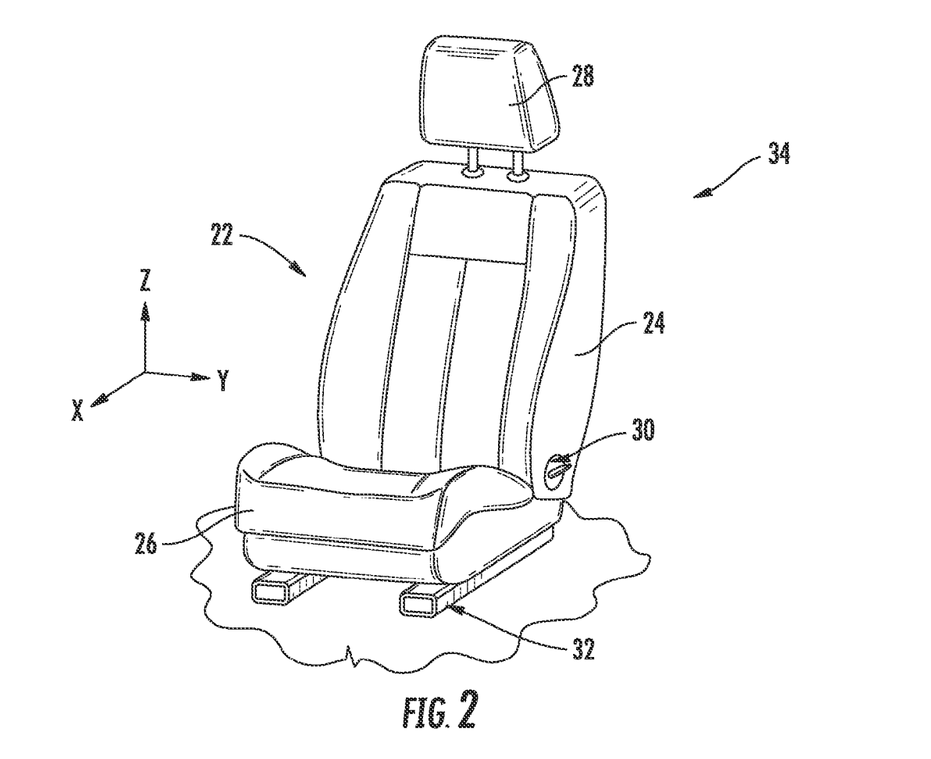
FIG. 2 is a perspective view of the vehicle seat of FIG. 1.

According to one embodiment as shown in FIG. 2, the seat 22 may be located anywhere within a vehicle (including the front, back, first, second, or third rows) and may include a seat back 24, a seat bottom or cushion 26 connected to the seat back 24, and a headrest 28 mounted on the seat back 24. The seat back 24 and the seat cushion 26 may be movable relative to each other. The vehicle seat 22 may be mounted and conveyed on a seat track 32 by an optional seat track mechanism. The seat track 32 may be attached to a floor of the vehicle 20. The seat 22 may include seat adjustment controls 30 to change the positioning of the seat 22 along the seat track 32 in the longitudinal direction of the vehicle. Alternatively or additionally, the seat adjustment controls 30 may be used change the positioning of the seat back 24 and the seat cushion 26 (e.g. the operation of a reclining mechanism that changes the relative angle between the seat back 24 and the seat cushion 26).

Figure 3A:
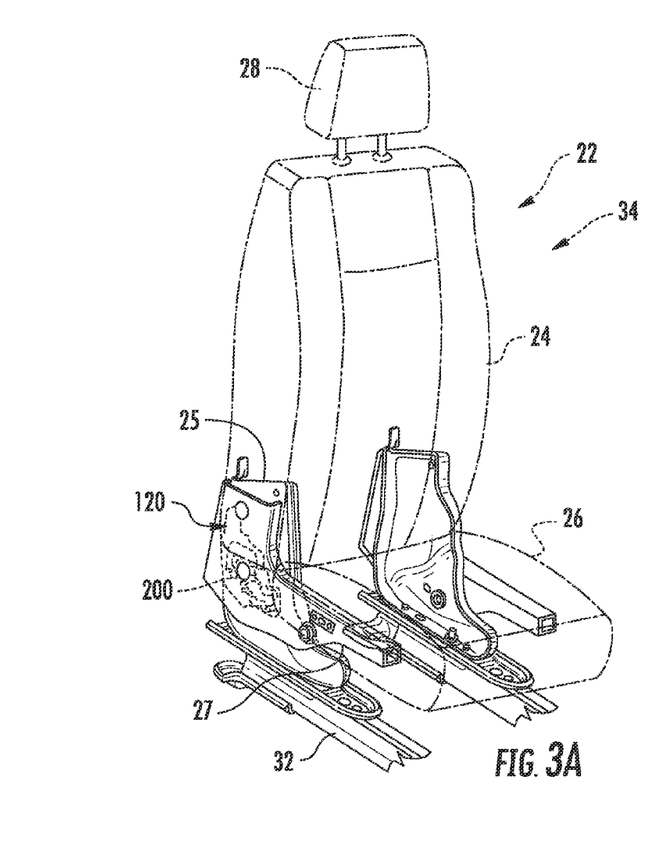
FIGS. 3A-3B are partially see-through, perspective views of the vehicle seat of FIG. 2 in a seated position and a folded position, respectively, according to one embodiment.

As shown in FIGS. 2 and 3A, the seat 22 may be in a first, use, or seated position 34 in which the seat back 24 is substantially vertical or upright (along the y-z plane) and the seat cushion 26 is substantially horizontal (along the x-y plant) in order to allow the occupant to sit in the seat 22. However, the seat back 24 and the seat cushion 26 may be angled relative to the axes to provide optimum comfort for the occupant.

Figure 3B:
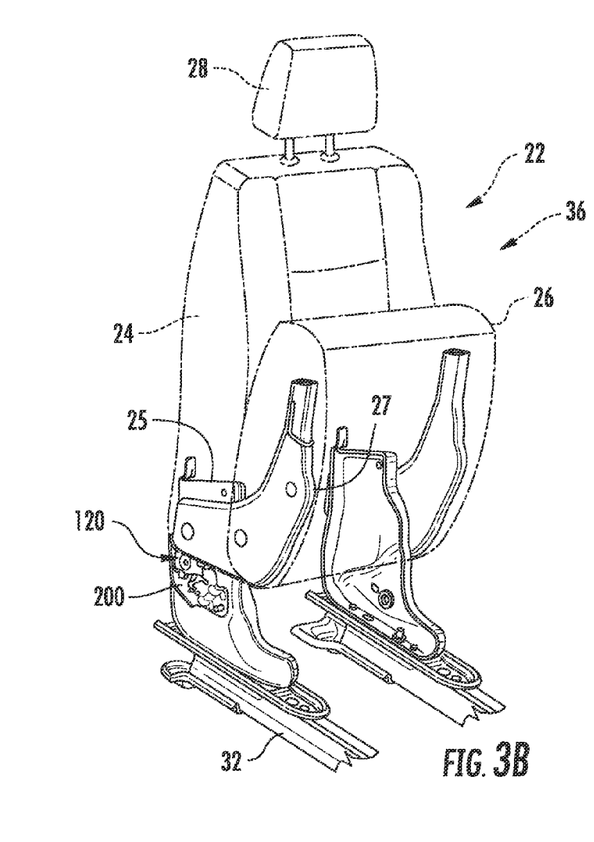

The seat 22 may be moved into a variety of different positions. For example, as shown in FIG. 3B, the seat 22 may be positioned in a second, stadium, or folded position 36. In the folded position 36, the seat cushion 26 may be folded up in a vertical or substantially vertical position and therefore parallel or substantially parallel to the seat back 24. Alternatively or additionally, the seat 22 may be folded into a variety of different configurations including but not limited to reclining the seat back 24 backward, folding the seat back 24 forward over the seat cushion 26, folding the entire seat 22 relative to the vehicle floor, and/or removing the seat 22 from the floor or seat track 32. The seat 22 may lock into each of the different configurations or positions.

Figure 4A:
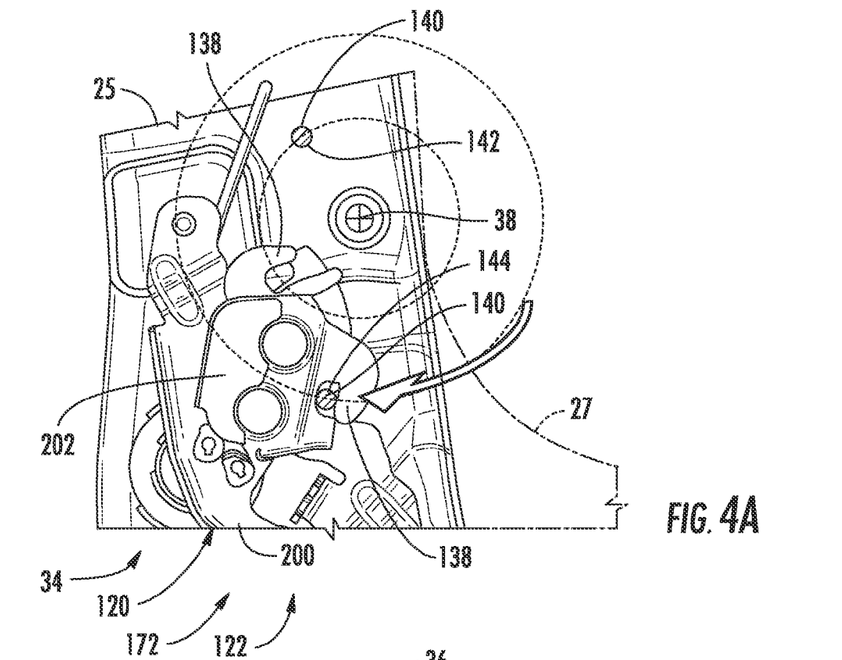
FIGS. 4A-4B are partially see-through, side views of a latch mechanism in a seated position and a folded position, respectively, that may be used in the vehicle seat of FIG. 3A according to one embodiment.
Figure 4B:
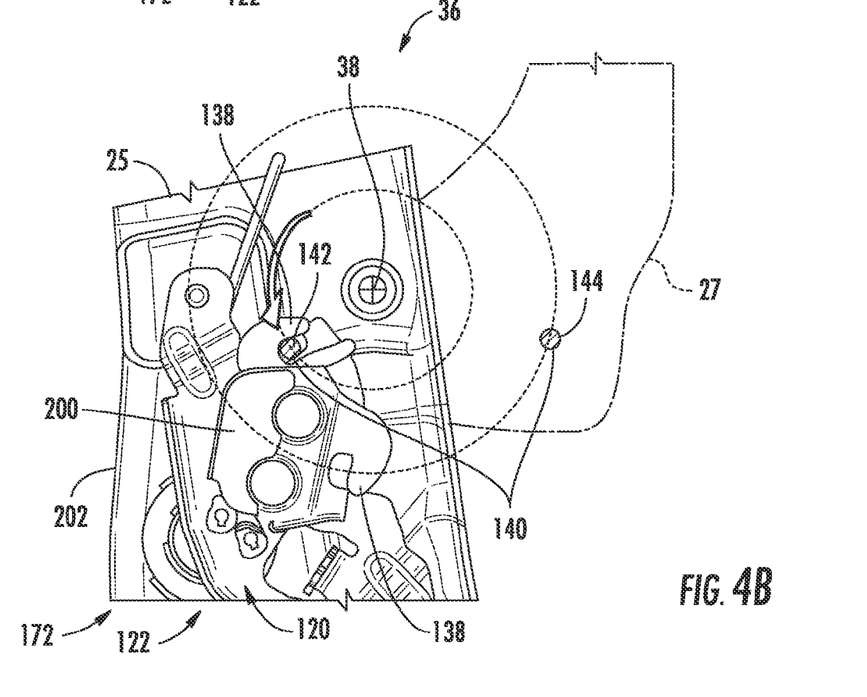

As shown in FIGS. 4A-4B, the lower bracket or seat cushion structure 27 may be attached to the upper bracket or seat back structure 25. The seat cushion structure 27 may rotate or pivot around a recliner or seat pivot axis 38, which moves the seat cushion 26 between the seated position 34 and the folded position 36 (as shown in FIGS. 3A-3B). The seat pivot axis 38 may extend, for example, along the y-axis of the vehicle 20 and may extend through both the seat back structure 25 and the seat cushion structure 27.

As shown in FIGS. 4A-4B, at least one of the seat back 24 or the seat cushion 26 may include at least one striker 140 to interact, engage, or lock with a locking or latch mechanism 120 (as described further herein) as portions of the seat 22 are moved. The striker 140 may be attached to and move with either the seat cushion structure 27 or the seat back structure 25. The striker 140 may extend from the seat cushion structure 27 toward the seat back structure 25 (or vice versa) and may be, for example, a rod, wire, tube, protrusion, or extension. According to one embodiment as shown in FIGS. 4A-4B, the seat cushion structure 27 may include two strikers 140 (an upper striker 142 and a lower striker 144) that rotate with the seat cushion structure 27 around the seat pivot axis 38.

In order to move and lock the various components of the seat 22, the seat 22 may include the locking or latch mechanism 120. The latch mechanism 120 may allow certain components within the seat 22 to move relative to each other. The latch mechanism 120 may lock portions of the vehicle seat 22 into particular positions. For example, as shown in FIGS. 3A-3B, the latch mechanism 120 may allow the seat back structure 25 (located within and supporting a portion of the seat back 24) and the seat cushion structure 27 (located within and supporting the seat cushion 26) to move relative to each other between the seated position 34 and the folded position 36.

The latch mechanism 120 may be positioned anywhere within the vehicle 20 (and the seat 22). As shown in FIGS. 4A-4B, the latch mechanism 120 may be attached to the seat back structure 25 and may removably attach with the seat cushion structure 27 through the strikers 140 as the seat cushion 26 is rotated. However, it is anticipated that the latch mechanism 120 may be attached to the seat cushion structure 27 and interact with strikers 140 on the seat back structure 25. It is also anticipated that that latch mechanism 120 may be located towards the bottom of the seat 22 or along the seat track 32 to allow the seat 22 to latch to the vehicle floor or the seat track 32.

To lock and move the seat cushion structure 27 relative to the seat back structure 25, the strikers 140 may be hooked into and removable from the latch mechanism 120. While one of the strikers 140 is engaged with the latch mechanism 120, the seat 22 (and latch mechanism 120) is in a locked position 122 (as shown in FIGS. 4A and 4B) and the seat back 24 and/or seat cushion 26 cannot move relative to each other. For example, to lock into the seated position 34 (as shown in FIG. 4A), the lower striker 144 may engage with, move into, or be hooked into the latch mechanism 120 (which locks the seat cushion 26 into position), while the upper striker 142 is not engaged with the latch mechanism

120. To lock into the folded position 36 (as shown in FIG. 4B), the seat cushion 26 may be rotated or folded, which moves the upper striker 142 toward and into the latch mechanism 120. Once the upper striker 142 engages with or hooks into the latch mechanism 120, the seat cushion 26 is locked in the folded position 36. The lower striker 144 may not be engaged with the latch mechanism 120 in the folded position 36.

In order to unlock the seat 22 to move the seat cushion 26, a control (which may be located on the seat adjustment controls 30) may be activated to unlock the latch mechanism 120 and allow the lower striker 144 or the upper striker 142 to move out of the latch mechanism 120, as described further herein. Accordingly, neither of the strikers 140 may be engaged with the latch mechanism 120 in an unlocked position 124 (as shown in FIG. 6C), and the seat back 24 and seat cushion 26 may be adjusted relative to each other.

Figure 5:
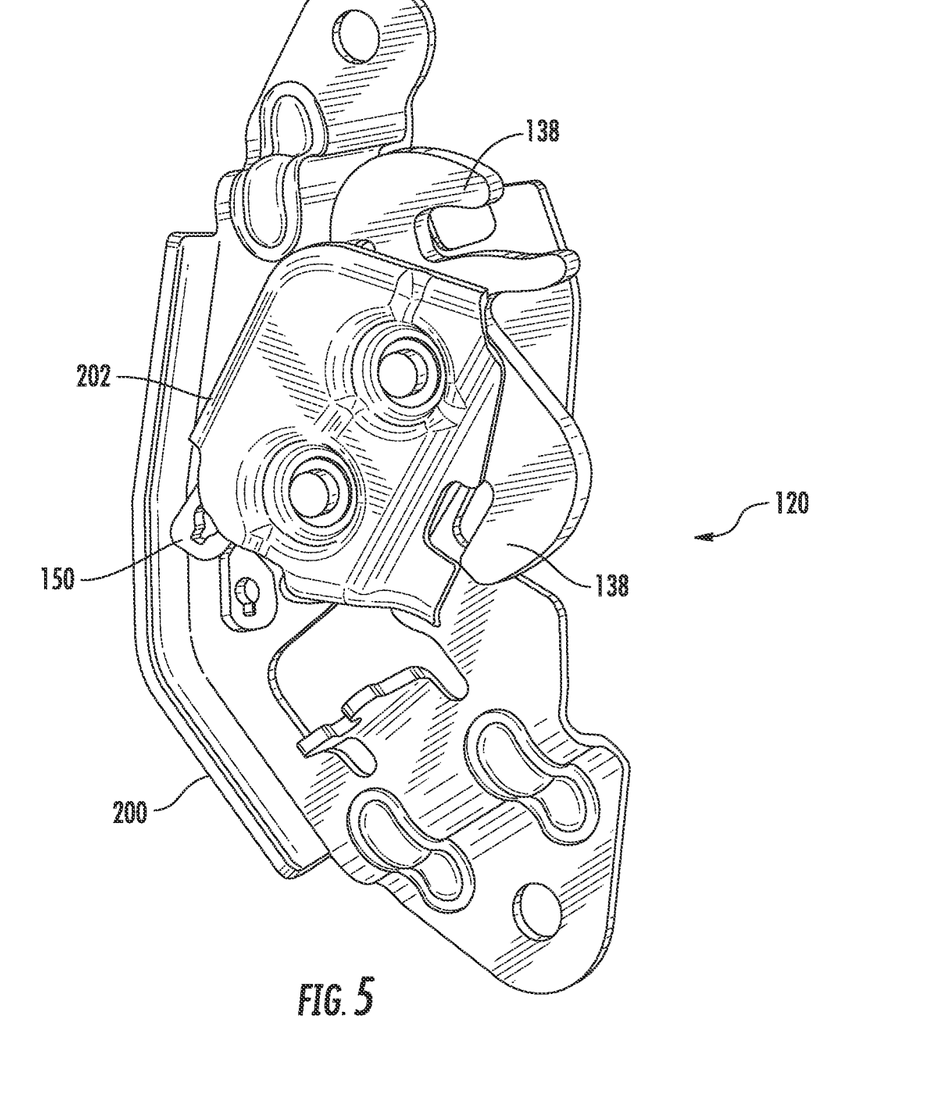
FIG. 5 is a perspective view of a latch mechanism that may be used in the seat of FIG. 3A according to one embodiment.

As shown in FIGS. 4A, 4B, and 5, the latch mechanism 120 be supported by and attach to a portion of the seat 22 through a housing element or an adapter bracket 200. As shown in FIG. 5, the latch mechanism 120 may further include a cover plate 202 to protect the working elements within the latch mechanism 120. The cover plate 202 may be attached to the bracket 200 and may partially or fully cover certain moving components within the latch mechanism 120.

Figure 6A:
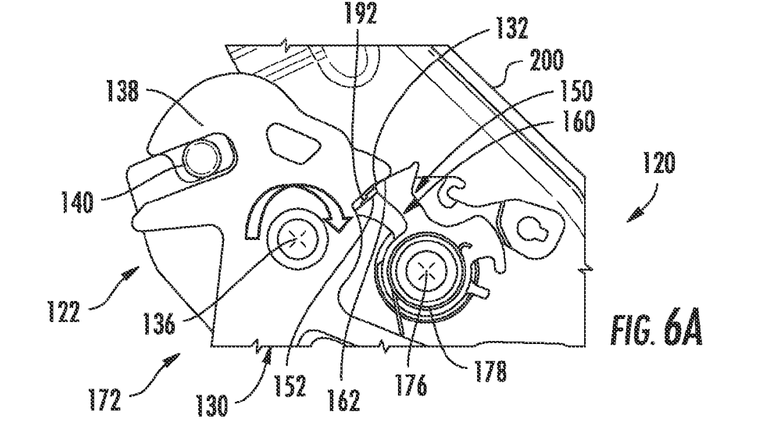
FIGS. 6A-6B are front views of the latch mechanism of FIG. 5 in an engaged position.
Figure 6B:
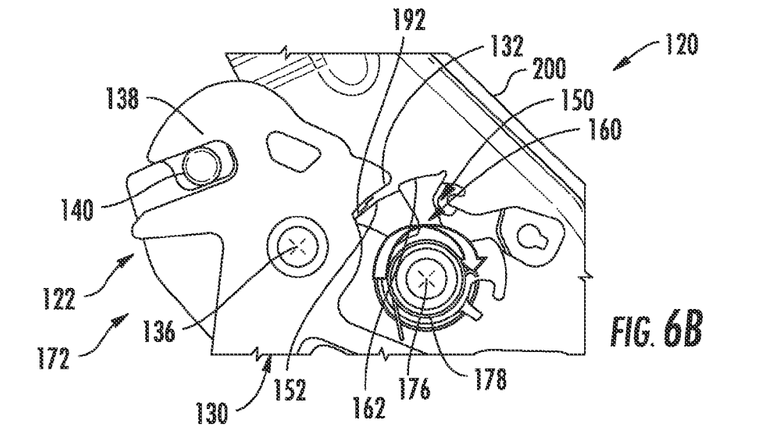
Figure 6C:
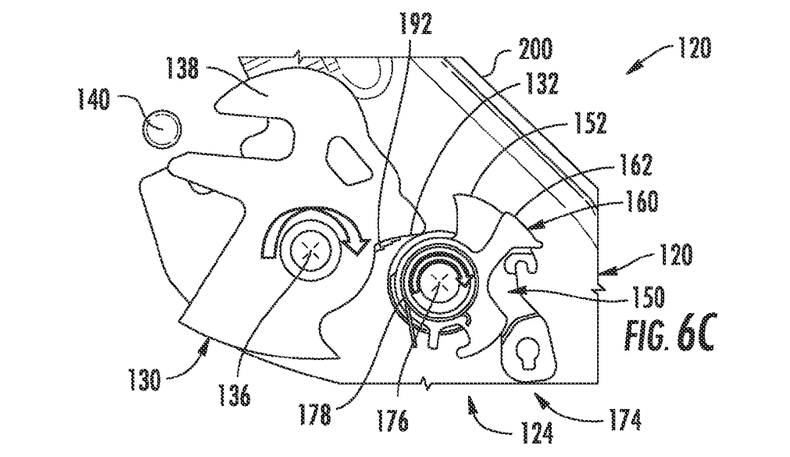
FIG. 6C is a front view of the latch mechanism of FIG. 5 in an unengaged position.

According to one embodiment as shown in FIGS. 6A-6B, the latch mechanism 120 may further include a hooking component 130, a structural or first cam 150, and a comfort or second cam 160. The hooking component 130 may secure the striker 140 while the cams 150 and 160 may be used to lock the latch mechanism 120 in the locked position 122.

The hooking component 130 may be rotatable about a first axis 136 to engage with and release the striker 140 into the locked position 122 and unlocked position 124, respectively. Accordingly, the hooking component 130 may include at least one claw or hook 138 to engage with the striker 140 in the engaged position 172 and/or the locked position 122. For example, the hooking component 130 may latch, clamp, or hook around the striker 140 to prevent the striker 140 from moving out of the locked position 122. As shown in FIGS. 4A-4B, the hooking component 130 may have two hooks 138 to lock with different strikers 140.

The hooking component 130 may further have a hook engagement surface 132, which may engage with or contact the cams 150 and 160. The hook engagement surface 132 may be located along a protrusion or extension of the hooking component 130, which may be located along a different area than the hook 138.

In the engaged position 172 (as shown in FIGS. 6A-6B), the first cam 150 and second cam 160 may be used to keep the hooking component 130 in the locked position 122 and prevent the hooking component 130 from moving. The cams 150 and 160 may be layered on top of or next to each other to allow both of the cams 150 and 160 to engage with the hooking component 130.

In the unengaged position 174 (as shown in FIG. 6C), the cams 150 and 160 may rotate about a second axis 176 (out of the engaged position 172 and away from the hooking component 130) to allow the hooking component 130 to rotate about the first axis 136 and toward the cams 150 and 160. As the hooking component 130 rotates, the hook 338 releases the striker 140 from the hook 138, thus allowing portions of the seat 22 to be moved. The seat adjustment controls 30 may be used to move or rotate the cams 150 and 160.

The first axis 136 and the second axis 176 may be parallel to each other, as shown in FIGS. 6A-6B. However, it is anticipated that the axes 136 and 176 may be at an angle or perpendicular to each other. The cams 150 and 160 may be independently rotatable about the second axis 176 and independently engagable with the hooking component 130. Accordingly to another embodiment, the cams 150 and 160 may be partially dependently rotatable with each other. As shown in FIGS. 6A-6C, the cams 150 and 160 may include at least one spring 178 to bias the cams 150 and 160 to rotate toward hooking component 130 and toward the engaged position 172.

More specifically, the first cam 150 may carry crash loads and may be used to ensure that the hooking component 130 does not accidently unlock, particularly under extreme conditions (such as a car crash). The first cam 150 can maintain and hold large amounts of load or force. The first cam 150 is independent of or does not rely on friction to keep it in place and to maintain its position relative to the hooking component 130. According to one embodiment, the first cam 150 may always be fully engaged to prevent the hooking component 130 from inadvertently unlocking. Accordingly, the first cam 150 may prevent malfunctioning and ensure the safety of the latch mechanism 120.

The second cam 160 may carry normal driving loads and contact the hooking component 130 under normal driving loads. The second cam 160 may compensate for the striker position tolerance and the striker misalignment tolerance. The position of the second cam 160 along the hooking component 130 and the amount of rotation of the second cam 160 may depend on the specific tolerances of the latch mechanism 120, thus creating a tight connection. The second cam 160 may keep the hooking component 130 locked tightly in the locked position 122 and prevent or eliminate any looseness, free movement, or rattle between the striker 140, the hooking component 130, and the bracket 200 due to size variations and tolerances. Accordingly, the second cam 160 may prevent excessive noise or movement and minimize the "buzz, squeak, rattle" (BSR). The second cam 160 may release or "pop open" under large amounts of force.

In order to engage with the hooking component 130, the first cam 150 may have a first cam engagement surface 152 and the second cam 160 may have a second cam engagement surface 162. The first and second cam engagement surfaces 152 and 162 may directly engage with or contact the hook engagement surface 132 and may be located along a protrusion or extension of the first cam 150 and the second cam 160. The engagement surface 132, 152, and 162 may optionally be tapered to prevent BSR. In the engaged position 172, the hook engagement surface 132 may contact at least one of the first cam engagement surface 152 or the second cam engagement surface 162 (as shown in FIGS. 6A-6B). In the unengaged position 174, the hook engagement surface 132 may not contact either of the first cam engagement surface 152 or the second cam engagement surface (as shown in FIG. 6C).

As shown in FIGS. 6-10, the hook engagement surface 132 may include a multi-level, tapered, terraced, incrementally extending, intervaled, or stepped surface 192 to engage with the first cam engagement surface 152, reduce the clearance between the hooking component 130 and the first cam 150, and prevent BSR. It is anticipated, however, that a stepped surface may be located on the first cam engagement surface 152, as shown in FIG. 11.

The stepped surface 192 may reduce or minimize the distance between the hook engagement surface 132 and the first cam engagement surface 152. Therefore, the stepped surface 192 may minimize the distance the hooking component 130 (and, therefore, the striker 140) can travel with respect to the first cam 150 if the second cam 160 disengages. Due to the minimized distance between the first cam 150 and the hooking component 130, the speed of the hooking component 130 (when the hooking component 130 contacts the first cam 150 after disengagement of the second cam 160) may be reduced. Therefore, the stepped surface 192 reduces the sound energy (and, therefore, the noise) when the hooking component 130 contacts the first cam 150 after the second cam 160 back drives.

According to one embodiment, the stepped surface 192 may improve the back drive force from approximately 726 N to 3000 N. Since the size of the gap between the first cam 150 and the hooking component 130 directly correlates to the amount of resulting noise when the second cam 160 releases, the amount of noise (e.g. sound energy) is minimized within the latch mechanism 120 to do the minimized gap. For example, the stepped surface 192 may reduce the sound energy from approximately 1000 to 10.

Additionally, the stepped surface 192 may provide structural reinforcement by allowing the cams 150 and 160 to work together by both contacting the hooking component 130 in the engaged position 172. Accordingly the movement of the hooking component 130 may be minimized since there is no or minimal clearance between the first cam engagement surface 152 and the hook engagement surface 132 and the BSR is reduced.

Figure 7A:
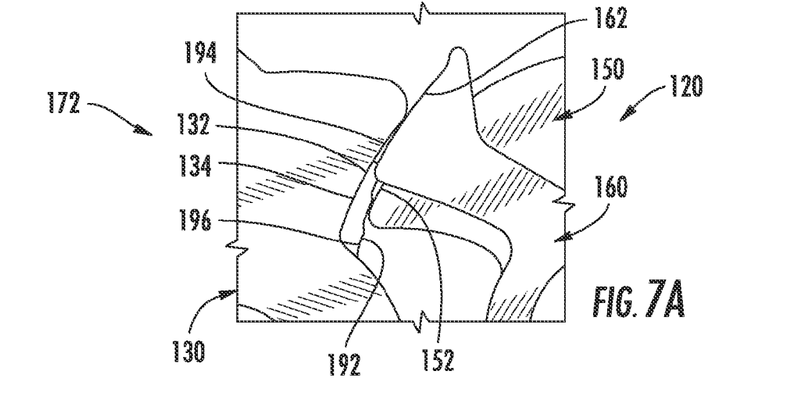
FIGS. 7A-7C are front views of the latch mechanism of FIG. 5 in the engaged position.
Figure 7B:
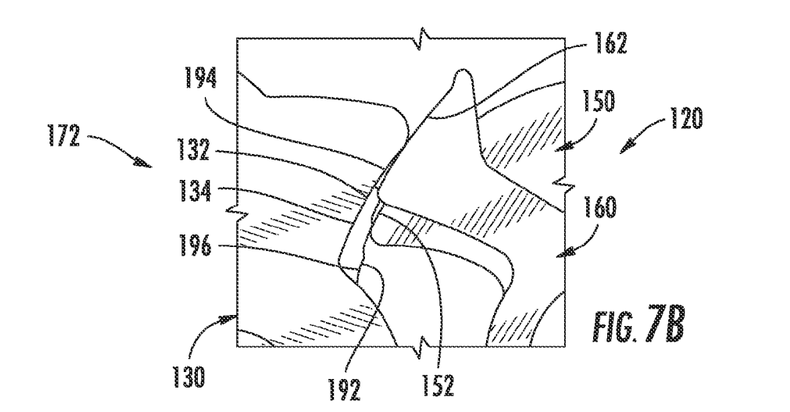

In the engaged position 172 as shown in FIG. 7B, the surface between the hook engagement surface 132 and the first cam engagement surface 152 may be a zero degree cam angle for static or dynamic structural loads since the stepped surface 192 may not be tapered and the first cam engagement surface 152 is independent of friction.

The stepped surface 192 may provide several surfaces at different heights and extending from the hook engagement surface 132 to provide a taper lock for the first cam 150. As shown, for example, in FIG. 7A, the stepped surface 192 may extend incrementally or in different levels from the hook engagement surface 132 and along at least a portion of the length of the hook engagement surface 132.

The stepped surface 192 may include any number of steps or intervals and transitions (the areas between the steps). According to one embodiment, the stepped surface 192 may include two, three, four, or five steps and one, two, three, or four transitions, respectively. The steps may be equal in length or may have different lengths and the transitions may be equal in height or may have different heights, according to the desired configuration. For example, the stepped surface 192 in FIGS. 7A-7B may be relatively higher due to higher transitions. However, the stepped surface 182 in FIGS. 9A-9C may be relatively lower due to lower transitions to allow the first cam 150 to move to the highest step 196 easier and to decrease the amount of transition between the steps. According to one embodiment, the transitions may range between 0.2 mm to 2 mm high. According to another embodiment, the transitions may be between 0.6 to 1.4 mm high. According to yet another embodiment, the transitions may be approximately 1 mm high. The top surface of the steps may be contoured or flat.

Figure 7C:
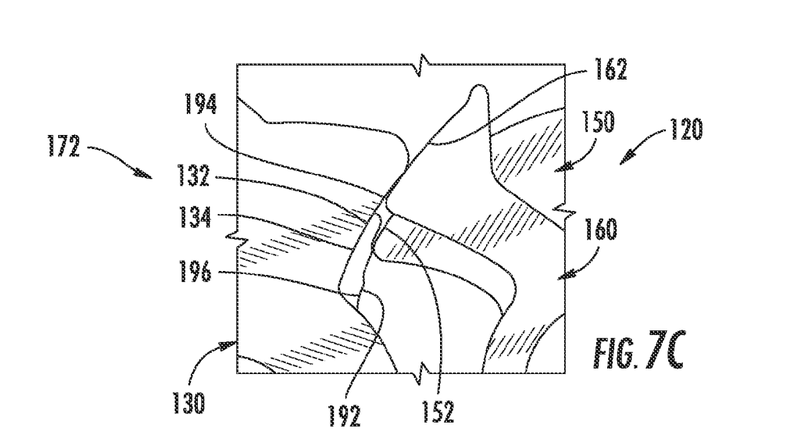

While moving into the engaged position 172, the first cam 150 may move up the stepped surface 192 on the hooking component 130 toward the highest step 196 until the first cam engagement surface 152 engages or contacts the stepped surface 192. Accordingly, as shown in FIGS. 7A-7C, the first cam engagement surface 152 may contact the hook engagement surface 132 anywhere along the stepped surface 192, according to the specific variations in tolerances, sizes, and dimensions of the latch mechanism 120, as well as the desired cam angle based on the relative positioning of the hooking component 130 and the first cam 150. The amount of rotation of the first cam 150 around the second axis 176 may depend on the specific tolerances and the heights of the steps on the stepped surface 192.

Figure 8A:
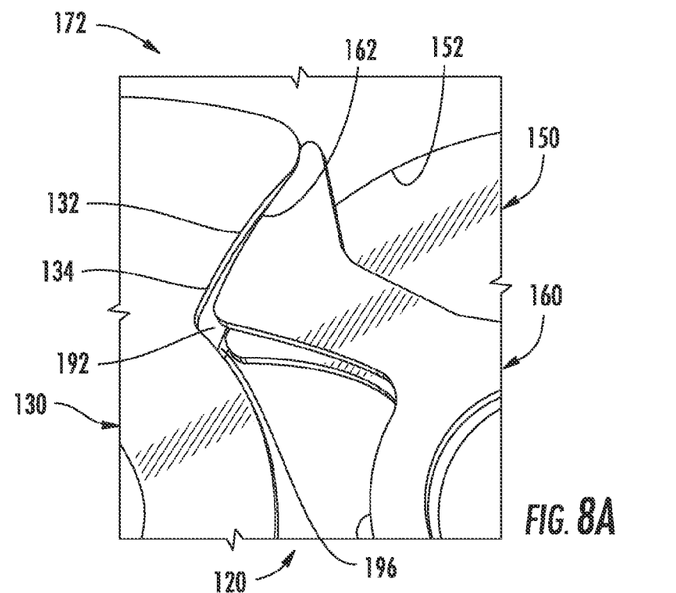
FIGS. 8A-8B are front views of the latch mechanism of FIG. 5 in the engaged position.
Figure 8B:
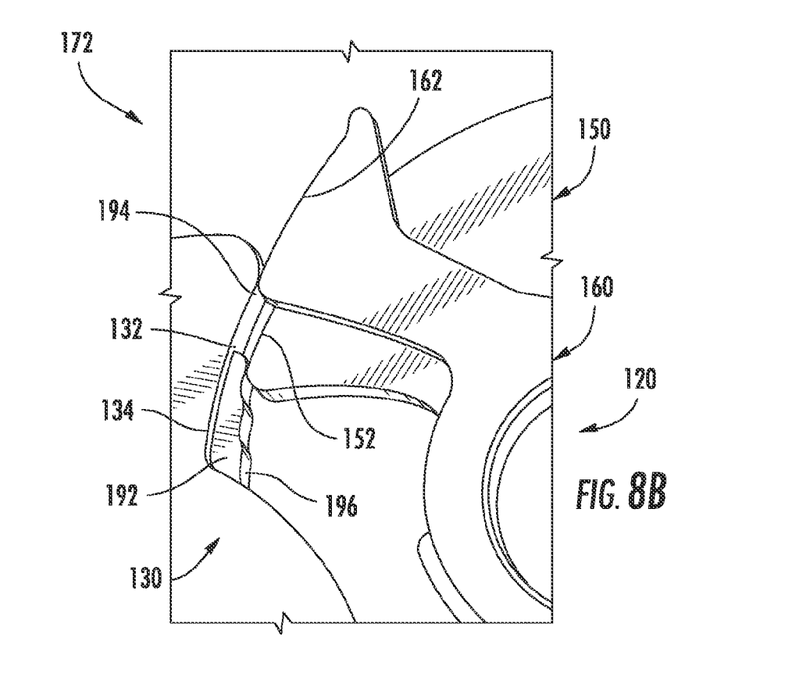

For example, as shown in FIG. 8A, the first cam engagement surface 152 has moved from the lowest step 194 to the highest step 196 along the stepped surface 192. Due to the tolerances of the latch mechanism 120, the first cam 150 of FIG. 8A contacts the highest step 196. However, as shown in FIG. 8B, the first cam engagement surface 152 contacts the second lowest step due to the specific tolerances. Accordingly, the latch mechanism 120 may have the tightest or closest fit possible between the first cam 150 and the hooking component 130.

As shown in FIG. 6A, if a large amount of stress is placed on the hooking component 130 (for example, a force applied to the top of the seat cushion 26 while in the folded position 36 or in the event of a car accident), the striker 140 may cause a torque force on the hooking component 130, forcing the hooking component 130 to rotate toward the cams 150 and 160. The load from the striker 140 may be transferred through the hooking component 130 to the cam engagement surfaces 152 and 162, placing additional stress on the cams 150 and 160. The second cam 160 may not be able to handle the stress of extreme striker positions. Therefore, the second cam 160 may back drive and rotate away from the hooking component 130, thereby disengaging and releasing from the hooking component 130 (as shown in FIG. 6B). However, since the stepped surface 192 is closely engaged or contacting the first cam engagement surface 152, the distance between the hooking component 130 and the first cam 150 is minimal. Accordingly, the resulting movement and noise between the hooking component 130 and the first cam 150 is minimized or eliminated.

If the first cam engagement surface 152 is located on a transition between stair steps, as shown in FIG. 7B, the first cam 150 may move down one step once the second cam 160 releases. However, the distance between the hooking component 130 and the first cam 150 is still greatly reduced compared to the hooking mechanism 330 and the structural cam 350 without a stepped surface (as shown in 12A-12C).

According to one embodiment shown in FIGS. 7A-8B, the hook engagement surface 132 may include both the stepped surface 192 and a continuous surface 134, which may be offset from each other along the hook engagement surface 132. Accordingly, the stepped surface 192 may only span a portion of the width of the hook engagement surface 132. The continuous surface 134 may also utilize a portion of the width of the hook engagement surface 132. The continuous surface 134 may be relatively smooth (e.g. without steps or separate levels) and may run alongside the stepped surface 192.

As shown in FIG. 8B, the continuous surface 134 may be within the arc of the second cam 160 and the stepped surface 192 may be within the arc of the first cam 150. In the engaged position 172, the continuous surface 134 may engage with the second cam engagement surface 162, while the stepped surface 192 may engage with the first cam engagement surface 152. Accordingly, the second cam engagement surface 162 may not contact the stepped surface 192 in the engaged position 172.

Figure 9A:
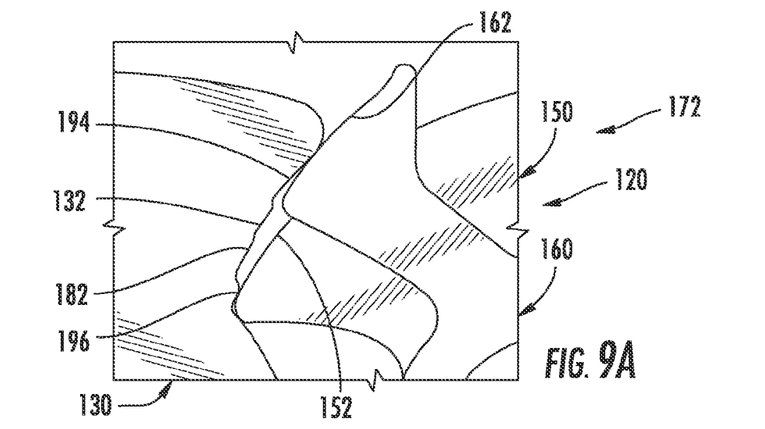
FIGS. 9A-9C are front views of a latch mechanism according to another embodiment.
Figure 9B:
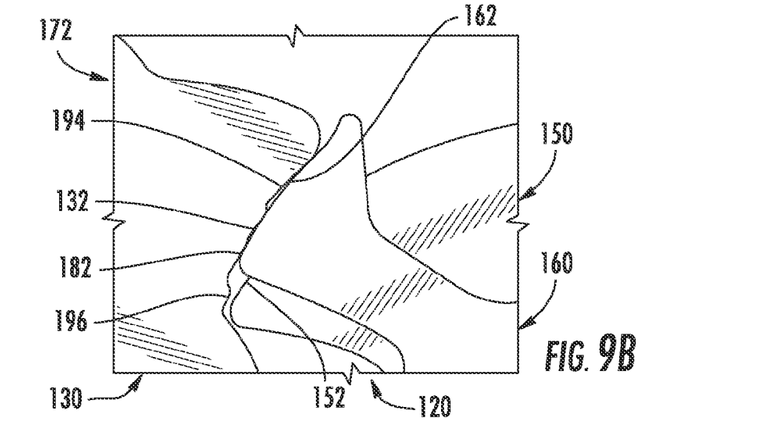
Figure 9C:
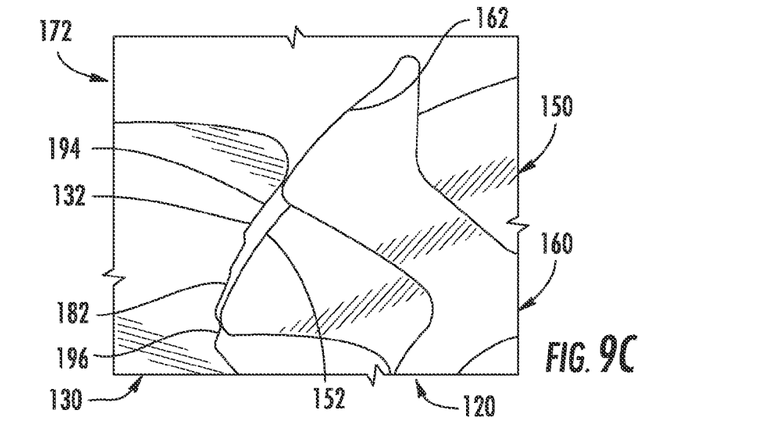

According to another embodiment shown in FIGS. 9A-9C, the hook engagement surface 132 may include a stepped surface 182 that extends along at least a portion of the width of the hook engagement surface 132 and is within the arc of both the first cam 150 and the second cam 160. Accordingly, both the first cam engagement surface 152 and the second cam engagement surface 162 may contact the stepped surface 182 in the engaged position 172. The stepped surface 182 may be less complex, quicker, and easier to tool or make.

Figure 10:
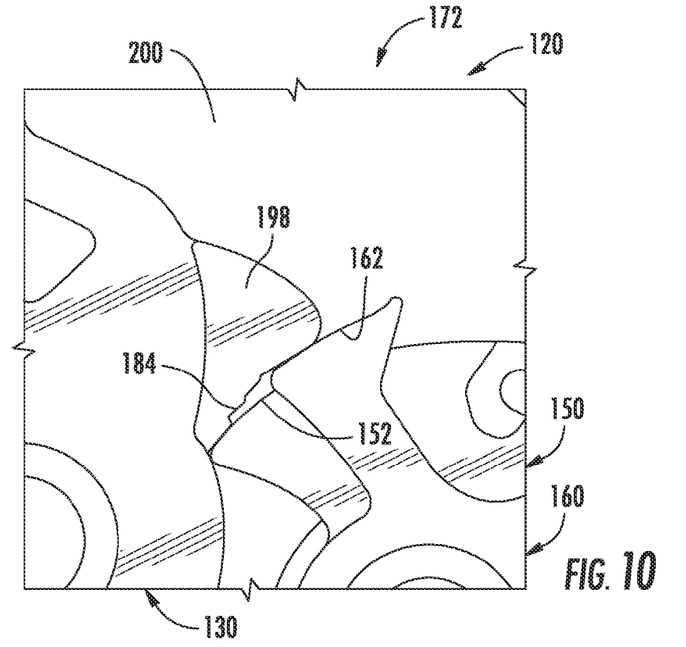
FIG. 10 is a front view of a latch mechanism according to another embodiment.
Figure 11:
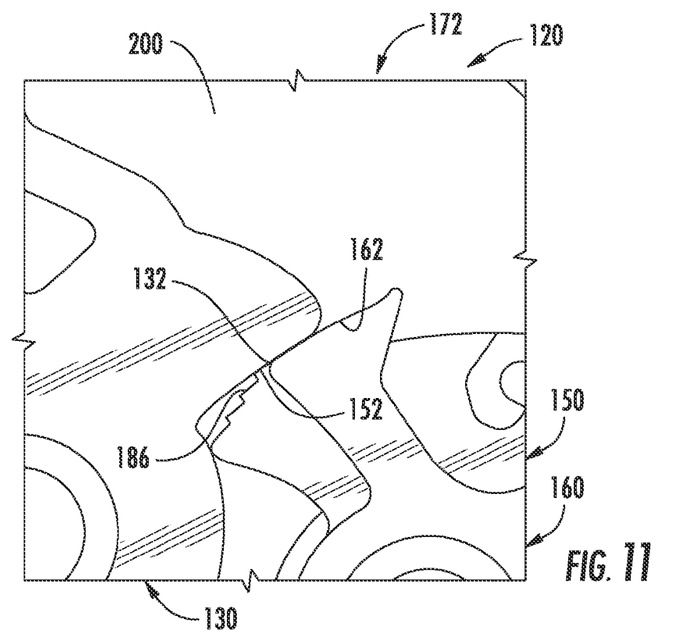
FIG. 11 is a front view of a latch mechanism according to yet another embodiment.

According to another embodiment shown in FIG. 10, an overmold or sheath 198 may provide a stepped surface 184. The sheath 198 may be permanently or temperately attached to a portion of the hooking component 130 (as shown in FIG. 10) or the first cam 150 with a variety of different attachment mechanisms, including but not limited to screws, hooks, fasteners, or adhesives. The sheath 198 may be an aftermarket add-on to an existing latch mechanism.

According to yet another embodiment shown in FIG. 11, a stepped surface 186 may be provided on the first cam engagement surface 152 and may engage with the hook engagement surface 132. The stepped surfaces 182, 184, and 186 may include the various embodiments and configurations of the stepped surface 192.

According to another embodiment, grease or coatings may be used within the components of the latch mechanism 120.

It is anticipated that the various embodiment and components described herein may be used in conjunction with each other and in variety of different configurations.

The embodiments disclosed herein allow a latch mechanism to be securely and firmly locked. Besides those embodiments depicted in the figures and described in the above description, other embodiments of the present invention are also contemplated. For example, any single feature of one embodiment of the present invention may be used in any other embodiment of the present invention.

Given the disclosure of the prevent invention, one versed in the art would appreciate that there may be other embodiments and modifications within the scope and spirit of the invention. Accordingly, all modifications attainable by one versed in the art from the present invention within the scope and spirit of the present invention are to be included as further embodiments of the present invention.

What is claimed is:

1. A latch for a vehicle seat comprising:
  a hooking component with a hook engagement surface,
    wherein the hooking component is rotatable about a first axis;
  a first cam with a first cam engagement surface; and
  a second cam with a second cam engagement surface,
    wherein the first cam and the second cam are rotatable about a second axis between an engaged position and an unengaged position,
    wherein the hook engagement surface contacts at least one of the first cam engagement surface and the second cam engagement surface in the engaged position,
    wherein one of the hook engagement surface or the first cam engagement surface includes a stepped surface extending incrementally from either the hook engagement surface or the first cam engagement surface.

2. The latch according to claim 1, wherein the hook engagement surface includes the stepped surface and the second cam engagement surface does not contact the stepped surface in the engaged position.

3. The latch according to claim 2, wherein the hook engagement surface further includes a continuous surface, wherein the second cam engagement surface contacts the continuous surface in the engaged position.

4. The latch according to claim 1, wherein the hook engagement surface includes the stepped surface and both the first cam engagement surface and the second cam engagement surface contact to the stepped surface in the engaged position.

5. The latch according to claim 1, wherein a sheath provides the stepped surface.

6. The latch according to claim 5, wherein the sheath is attachable to one of the hooking component or the first cam.

7. The latch according to claim 1, wherein the stepped surface includes two, three, or four steps.

8. The latch according to claim 1, wherein either hook engagement surface or the first cam engagement surface moves up the stepped surface toward a highest step until either hook engagement surface or the first cam engagement surface contacts the stepped surface in the engaged position.

9. The latch according to claim 1, wherein the hooking component comprises a hook that engages a striker in the engaged position.

10. The latch according to claim 1, wherein the first cam and the second cam include at least one spring to bias the first cam and the second cam toward the engaged position.

11. The latch according to claim 1, wherein the latch locks a portion of the vehicle seat into a particular position.

12. A vehicle seat comprising:
  a seat back;
  a seat cushion,
    wherein at least one of the seat back or the seat cushion is movable relative to the other of the seat back or the seat cushion;
  a striker attached to either the seat back or the seat cushion; and
  a latch,
    wherein the striker is engagable with and removable from the latch between a locked position and an unlocked position,
    wherein the striker is engaged with the latch in the locked position,
    wherein either the seat back or the seat cushion cannot move relative to the other in the locked position,
    wherein the latch includes:
    a hooking component with a hook engagement surface,
      wherein the hooking component is rotatable about a first axis;
    a first cam with a first cam engagement surface; and
    a second cam with a second cam engagement surface,
      wherein the first cam and the second cam are rotatable about a second axis between an engaged position and an unengaged position,
      wherein the hook engagement surface contacts at least one of the first cam engagement surface and the second cam engagement surface in the engaged position,
      wherein one of the hook engagement surface or the first cam engagement surface includes a stepped surface extending incrementally from either the hook engagement surface or the first cam engagement surface.

13. The vehicle seat according to claim 12, wherein the hook engagement surface includes the stepped surface and the second cam engagement surface does not contact the stepped surface in the engaged position.

14. The vehicle seat according to claim 13, wherein the hook engagement surface further includes a continuous surface, wherein the second cam engagement surface contacts the continuous surface in the engaged position.

15. The vehicle seat according to claim 12, wherein the hook engagement surface includes the stepped surface and both the first cam engagement surface and the second cam engagement surface contact to the stepped surface in the engaged position.

* * * * *